United States Patent [19]

Burdick

[11] Patent Number: 5,489,638

[45] Date of Patent: Feb. 6, 1996

[54] POLY(VINYL ALCOHOL) FLUIDIZED POLYMER SUSPENSIONS

[75] Inventor: Charles L. Burdick, Landenberg, Pa.

[73] Assignee: Aqualon Company, Wilmington, Del.

[21] Appl. No.: 862,046

[22] Filed: Apr. 2, 1992

[51] Int. Cl.$^6$ .............................. C08K 5/04; C08L 29/04; C08L 5/04; D21H 11/00

[52] U.S. Cl. .................... 524/394; 524/28; 524/45; 524/55; 524/312; 524/423; 524/503; 162/164.1; 162/181.2; 162/178; 162/179

[58] Field of Search .......................... 524/394, 423, 524/503, 55, 28, 312, 415; 525/57; 162/164.1, 181.2, 178, 179

[56] References Cited

U.S. PATENT DOCUMENTS

| | | | |
|---|---|---|---|
| 3,298,862 | 1/1967 | Fairchild et al. | 117/155 |
| 3,442,848 | 5/1969 | Sezaki et al. | 524/394 |
| 4,069,062 | 1/1978 | Bürge | 524/2 |
| 4,343,134 | 8/1982 | Davidowich et al. | 53/431 |
| 4,343,403 | 8/1982 | Daniels et al. | 206/812 |
| 4,409,353 | 10/1983 | Umekawa et al. | 524/423 |
| 4,879,336 | 11/1989 | Schilling et al. | 524/503 |
| 4,883,536 | 11/1989 | Burdick | 106/194 |
| 4,883,537 | 11/1989 | Burdick | 106/194 |
| 5,028,263 | 7/1991 | Burdick | 524/423 |
| 5,112,445 | 5/1992 | Winston et al. | 162/178 |

FOREIGN PATENT DOCUMENTS

| | | | |
|---|---|---|---|
| 0357962 | 8/1989 | European Pat. Off. | C08J 3/03 |
| 1085611 | 4/1954 | France . | |
| 7422838 | 7/1974 | France . | |
| 78000008AB | 1/1978 | Japan . | |

*Primary Examiner*—Paul R. Michl
*Assistant Examiner*—LaVonda DeWitt
*Attorney, Agent, or Firm*—David Edwards

[57] ABSTRACT

At least 20% of poly(vinyl alcohol) (PVA) is dispersed in an aqueous solution of at least one salt dissolved therein selected from the group of sodium or potassium formate, sodium, potassium, or magnesium sulfate, sodium or potassium citrate, sodium or potassium polyacrylate, or mixtures thereof. This aqueous suspension of PVA is useful in systems in which PVA is dissolved in order to reduce the time of dissolution.

7 Claims, No Drawings

POLY(VINYL ALCOHOL) FLUIDIZED POLYMER SUSPENSIONS

This invention relates to fluid suspensions of poly(vinyl alcohol) in aqueous systems that contain specific dissolved salts.

BACKGROUND OF THE INVENTION

Prior to the present invention, poly(vinyl alcohol) (hereinafter referred as "PVA") has traditionally been handled in its dry, particulate form. The water soluble forms of PVA are known to be 77 to 99.8% hydrolyzed. Problems associated with dry PVA include undesirable dust generation, poor dispersibility when added to aqueous systems, and undesirably long dissolution times.

The dust associated with dry, particulate PVA presents the same conventional handling problems as are encountered with other particulate materials.

When added to aqueous systems, PVA tends to agglomerate to form clumps. Agglomeration can be reduced in many cases by adding the polymer to the aqueous system slowly with agitation. Slow dissolution substantially reduces the speed of manufacturing operations.

For the above reasons, plant operators desire a fast, effective, and simple way of incorporating PVA into an aqueous system. In other words, users of PVA desire a stable, concentrated, PVA suspension that can be used to incorporate PVA into aqueous solutions readily, without formation of agglomerates or clumps, and which may be handled without the problems associated with a dry powder.

Several formulations exist in the prior art that describe suspension systems of various water soluble polymers that avoid the above mentioned problems. For example, U.S. Pat. No. 4,883,536 discloses an aqueous suspension of at least 15% by total weight of the suspension, of at least one anionic or nonionic water-soluble polymer dispersed in an aqueous solution of an ammonium salt having a multivalent anion, wherein the weight ratio of the ammonium salt to the water is at least 0.15. Another example is U.S. Pat. No. 4,883,537 that discloses the use of potassium carbonate in aqueous suspensions of sodium carboxymethylcellulose.

The present invention overcomes the above mentioned problems in industrial practice in a different manner than the above prior art by using different types of salts for preparing fluidized suspensions of PVA.

SUMMARY OF THE INVENTION

The present invention is directed to an aqueous suspension comprising at least 20% by total weight of the suspension, of poly(vinyl alcohol) dispersed in an aqueous solution of at least one salt selected from the group consisting of sodium or potassium formate, sodium, potassium, or magnesium sulfate, sodium or potassium citrate, sodium or potassium polyacrylate and mixtures thereof.

This invention also relates to a method of using the aqueous suspended product of this invention in paper size press applications.

DETAILED DESCRIPTION OF THE INVENTION

It has been found that aqueous fluid suspensions of 20% by weight or greater of poly(vinyl alcohol) can be prepared by dispersing the PVA in water that contains appropriate concentrations of selected salts without causing the PVA to thicken to a paste consistency. These fluidized polymer suspensions of PVA can be used in many applications. Such PVA suspensions dissolve significantly faster, when added to dilution water, as compared to dry PVA.

The water solubility of PVA varies as a function of the polymer's degree of hydrolysis. The water soluble varieties of PVA range in degree of hydrolysis from 77 to 99.8%. PVA with a degree of hydrolysis from 87 to 90% has the highest solubility in cold water (i.e., ambient or less).

A number of salts are useful to prepare aqueous suspensions of PVA. These included sodium or potassium formate, sodium, potassium or magnesium sulfate, sodium or potassium citrate, and sodium or potassium polyacrylate. Sodium formate and sodium sulfate are preferred salts. Mixtures of salts such as sodium formate with sodium carboxymethylcellulose or styrene maleic anhydride copolymer can also be employed to prepare suspensions of the PVA.

The salts of this invention should be present in the suspension in the amount of from about 10% to about 40% (preferably, 10% to about 20%) by weight, based on the total weight of the suspension. The ratio of salt to water in the suspension is 1:1 to 1:7.

Although water is the normal carrier medium for this invention, the incorporation of glycerin into the fluid suspension was effective to improve film properties of the suspension (as compared to dry PVA) in the cases where the suspension, or dry PVA, was dissolved in water then cast as a film. Other additives such as sodium alginate or hydrophobic sizing agents (e.g., rosin soap, dispersed rosin size, wax emulsions, polyethylene emulsions, alkyl ketene dimer, and alkyl succinic anhydride) may also be incorporated into fluidized polymer suspension of this invention.

Suspensions, according to this invention, contain from about 15% to about 35% of PVA, preferably 20% to 25%, by weight, based on the total weight of the suspension.

A number of other additives can be present in the present invention to provide beneficial properties to the suspension. Stabilizers are a preferred additive such as xanthan gum or sodium carboxymethylcellulose. These stabilizers increase the time over which the suspension will remain stable. Stabilizers in the instant invention are typically present in the amount of up to 1.5%, and are preferably used in an amount of 0.05% to 0.25%.

Other additives that can be used include preservatives, such as Proxel GXL (marketed by ICI), in an amount of up to 0.3%, preferably about 0.1%. Dispersants, surfactants, glycols, pigments, and thickening agents can also be incorporated into the PVA suspension of this invention when needed for a particular application. These can be generally used in amounts up to 10% by weight of the total suspension.

In a preferred embodiment of the invention, a suspension of 20–25% by weight of PVA was prepared by adding this water soluble polymer to an aqueous solution of concentrated sodium formate to form a fluid pourable suspension. This suspension can give useful performance properties in a paper size press, calendar stack, or paper coating applications.

In a second preferred embodiment of the present invention, a fluid pourable suspension of 20–25% by weight of PVA was prepared in a medium including a dissolved salt such as sodium sulfate or potassium sulfate, glycerin and water.

The PVA suspensions of this invention can be prepared by dissolving the salt in water to form an aqueous salt solution and, then, dispersing with agitation the PVA therein. In the case where other additives are employed, these are typically added to the water before the salt. In some instances, heat may be needed to effect readily the dissolution of certain salts.

The PVA suspensions of this invention are useful in virtually all applications where dry PVA polymers are presently being used. The applications in which the dispersions of this invention may be used include textiles, adhesives, paper, construction materials, and other applications where dry PVA is currently being used.

The advantages of the present invention as compared to the prior art use of dry powdered PVA include: 1) the elimination of dust in handling of the PVA; 2) a faster dissolution rate and the elimination of lumping of the PVA when added to dilution water; 3) significantly reduced foaming of the PVA in solution; 4) improved performance in a paper size press application; and 5) in the case of PVA suspensions in salt, glycerine, and water, more flexible film properties of the invention in end use application.

The suspensions of this invention have a long shelf life without separating and can readily be added to aqueous systems by simply adding, e.g., pouring, the suspension into the aqueous system. Agitation enhances dissolution. The manner in which this suspension is used in the industry is limited only by the limitation placed on aqueous suspensions.

This invention will be further illustrated by the following examples.

EXAMPLE 1

A quantity of 57.2 parts by weight of water was added to a mixing vessel and 0.20 parts by weight of xanthan gum was added to the water and stirred to dissolve. After the xanthan gum dissolved, 17.5 parts by weight of sodium formate was added to the water and stirred to dissolve. Following the sodium formate dissolution step, 25 parts by weight of Airvol® 540S, high viscosity poly(vinyl alcohol) (available from Air Products Company) were added to the water and stirred to disperse. In a final step, 0.1 parts of Proxel® GXL preservative was added to the suspension.

It was observed that the final product was very fluid and pourable. The PVA particles did not dissolve in the concentrated sodium formate aqueous solution but instead appeared to swell in this medium. The viscosity of this suspension was measured with a Stormer viscometer (a widely use instrument in the latex paint industry for measuring viscosity) and found to be 100 Krebs Units ("KU") in viscosity. Generally, suspensions with a viscosity of greater than 135 KU would not be considered useful because their high viscosity would preclude ease of handling.

In a comparative experiment, the same procedure was employed as above except that 25 parts by weight of Natrosol® 250LR polymer (marketed by Aqualon Company) was added to the aqueous sodium formate solution instead of the PVA. In this case, a fluid suspension of the water soluble polymer was not observed, but instead a thick unusable paste was obtained.

Natrosol 250LR hydroxyethylcelluose (HEC) is a non-ionic water soluble polymer similar in hydroxyl functionality and molecular weight compared to Airvol® 540S polymer. Despite these similarities, it was shown in this example that the Natrosol 250LR HEC did not yield a fluid suspension in the same medium that was suitable for PVA. This example thus shows that PVA behaves much differently in aqueous media that contain dissolved salts as compared to Natrosol® 250LR hydroxyethylcellulose polymer.

EXAMPLE 2

A quantity of 0.2 parts by weight of xanthan gum was added to 69.7 parts by weight of water and stirred to dissolve. After the xanthan gum dissolved, 10 parts by weight of sodium sulfate was added to the water and stirred to dissolve. Heating was found to be useful to make the sodium sulfate dissolution step proceed. After the sodium sulfate dissolved, 20 parts by weight of Airvol® 540 polymer was added to the solution and stirred to disperse. As a final step, 0.1 parts of Proxel® GXL material was added to the suspension as a preservative. A fluid pourable suspension was obtained. This suspension was found to have a Stormer viscosity of 86 Kreb Units ("KU").

As a control experiment, Natrosol® 250LR hydroxyethylcellulose was substituted for Airvol® 540 PVA in the above suspension formulation. In this case, a fluid suspension was obtained initially but then gelled to a thick paste after 1 hour.

As another control experiment, Airvol® 540S polymer was substituted for Airvol® 540 in the above suspension formulation. The polymer Airvol® 540S has a finer particle distribution than Airvol® 540. In this second comparative experiment, a thick paste was obtained with a Stormer viscosity of greater than 140 Kreb Units.

EXAMPLE 3

The same procedure as in Example 2 above was used to prepare a suspension of Airvol® 540 PVA except, in this instance, potassium sulfate was substituted for sodium sulfate. A fluid pourable suspension was observed with a Stormer viscosity of 103 Kreb Units.

EXAMPLE 4

The same procedure as in Example 3 was used with the exception that Airvol® 803 PVA (a low molecular weight PVA) was substituted for Airvol® 540 as the PVA ingredient. In this experiment, a fluid suspension of the PVA was obtained with a Stormer viscosity of 82 Kreb Units.

This example showed that PVA of various molecular weights could be used in the present invention.

EXAMPLE 5

To 95 parts by weight of the fluidized polymer suspension from Example 1, 5 parts by weight of 50% rosin soap sizing agent was added. The resultant mixture was observed to be a fluid suspension with a Stormer viscosity of 95 Kreb Units.

EXAMPLE 6

A quantity of 1 part by weight of Kelgin XL sodium alginate (marketed by Kelco Inc.) was added to 54 parts by weight of water and was stirred to dissolve. After dissolution occurred, 20 parts by weight of sodium formate were added to the water and stirred to dissolve. As a final step, 25 parts by weight of Airvol® 540S were added to the mixture and stirred. A fluid suspension with a Stormer viscosity of 61 Kreb Units was obtained.

COMPARATIVE EXAMPLE A

Suspensions were attempted of 20% by weight Airvol® 540S PVA in concentrated aqueous solutions using the following salts: sodium chloride, sodium acetate, Ambergum 3021 sodium carboxymethylcellulose, Scripset 700 (Hercules) styrene maleic anhydride copolymer, aluminum sulfate (18 hydrate), and potassium bicarbonate. However, in each of these cases a fluid suspension was not obtained. A summary of the specific formulations attempted is shown in Table 1.

TABLE 1

UNSUCCESSFUL ATTEMPTS TO PREPARE FLUID 20 WT % PVA SUSPENSIONS

| Test | Water (parts) | Xanthan (parts) | Salt (parts) | | PVA (parts) | Stormer Viscosity (KU) |
|---|---|---|---|---|---|---|
| a | 46.8 | 0.2 | NaCl | 33 | 20 | >140 |
| b | 46.8 | 0.2 | sodium acetate | 33 | 20 | >140 |
| c | 59.8 | 0.2 | potassium bicarbonate | 20 | 20 | >140 |
| d | — | — | Ambergum 3021 | 80 | 20 | >140 |
| e | — | — | Scripset 700 | 80 | 20 | >140 |
| f | 64.8 | 0.2 | Aluminum sulfate.18 H$_2$O | 15 | 20 | >140 |

This comparative example demonstrated that not all aqueous salt solutions are suitable for the preparation of fluid suspensions within the scope of this invention of 20% or greater PVA content.

EXAMPLE 7

Fluid suspensions were prepared of Airvol® 540S in aqueous systems containing using the following salts: magnesium sulfate, potassium carbonate, sodium citrate, potassium citrate, and Dispex N-40 (Allied Colloids—40% sodium polyacrylate in water). In each of these cases, fluid pourable suspensions of 20 wt % PVA were observed. The specific formulations are shown in Table 2.

TABLE 2

SUCCESSFUL 20% SUSPENSIONS OF PVA IN AQUEOUS SALT SOLUTIONS

| Test | Water (parts) | (parts) | Salt (parts) | PVA (parts) | | Stormer Viscosity (KU) |
|---|---|---|---|---|---|---|
| | | CMC-7L1T | | | | |
| a | 58 | 2.0 | Na citrate 20 | Airvol ™ 540S | 20 | 82 |
| b | 58 | 2.0 | Potassium citrate 20 | Airvol ™ 540S | 20 | 76 |
| c | — | — | Dispex N-40 80 | Airvol ™ 540S | 20 | 122 |
| | | xanthan | | | | |
| d | 59.85 | 0.15 | potassium carbonate 20 | Airvol ™ 540S | 20 | 65 |
| e | 64.85 | 0.15 | magnesium sulfate 15 | Airvol ™ 540S | 20 | 82 |

EXAMPLE 8

Fluid suspensions were prepared of PVA in mixtures of salts in which one of the salt components was polymeric in nature.

In one of these experiments, 100 parts by weight of the fluid suspension from Example 1 were mixed with 85 parts by weight of Ambergum 3021 sodium carboxymethylcellulose and parts by weight of Airvol® 540S polymer, such that the final PVA content was 20% by weight. The final product was a fluid pourable suspension having a Stormer viscosity of 115 Kreb Units.

In a like experiment, 100 parts by weight of the suspension from Example 1 were mixed with 85 parts by weight of Scripset 700 styrene maleic anhydride copolymer and 15 parts by weight of Airvol® 540S polymer. This formulation yielded a fluid pourable suspension containing 20% by weight of PVA having a Stormer viscosity of 116 Kreb Units.

EXAMPLE 9

A sample of 40 grams of the polymer suspension of Airvol® 540S polymer of Example 1 was added to 160 grams of dilution water while stirring. It was observed that the suspension dispersed readily without lumps. The viscosity of the water to which the fluid PVA suspension had been added was observed to increase rapidly. There was very little foam evident. After 15 minutes of stirring, the PVA appeared to be predominantly dissolved. This solution was poured through a 100 mesh screen and found to show relatively few insoluble gel particles. The +100 mesh material was washed into a tared container and dried and the final weight of insoluble gel particles was found to be approximately 0.01 grams.

For comparative purposes a quantity of 10 grams of dry powdered Airvol® 540S PVA was added to 190 grams of water with good agitation. The dry PVA was added slowly and uniformly to the water to try to obtain good dispersion of the polymer in the water; however, in spite of the above mentioned precautions taken, lumping of the PVA was observed as it was added to the water. When the PVA and water mixture was stirred to dissolve the PVA, significant foam generation was also observed. After 15 minutes of stirring, the PVA solution was filtered through a 100 mesh screen. A number of undissolved lumps and gel particles were observed. The dried weight of these +100 mesh gel particles was 0.2 grams.

This experiment demonstrated that a fluid suspension of PVA of the present invention gave significant improvements in solution preparation as compared to dry powdered PVA. These improvements were threefold in dimension: 1) the elimination of PVA lump formation upon addition to dilution water; 2) more rapid dissolution of the PVA; and 3) a significant reduction in the quantity of foam generated in the PVA solution.

EXAMPLE 10

In a paper size press application, 40 lbs/ream basis weight paper with a starting Gurley porosity value of 30 seconds was treated with an 8% solution of Stayco C starch at 65° C. The wet weight pickup of the starch solution onto the paper in these tests was 30% of basis weight. In separate size press tests, the starch solution used to surface-treat the paper was modified with various levels of either dry Airvol® 540S polymer as an additive, or with various levels of the fluid suspension of Airvol® 540S suspension product from Example 1. These additives were extensively cooked with the starch in separate preparations to assure adequate dissolution.

The results from these size press tests are shown in Table 3.

TABLE 3

GURLEY POROSITY VALUES
OF SIZE PRESS TREATED PAPER

| Tpye of Size Press Treatment Treated Paper | Gurley Porosity of Treated Paper (seconds) |
|---|---|
| None | 30 |
| 8% Starch Only, No Modifier | 46 |
| 8% Starch with 0.25% Dry Airvol ™ 540S | 81 |
| 8% Starch with 0.30% Dry Airvol ™ 540S | 89 |
| 8% Starch with 0.5% Dry Airvol ™ 540S | 154 |
| 8% Starch with 0.25% Airvol ™ 540S (Active), PVA Fluid Suspension | 80 |
| 8% Starch with 0.3% Airvol ™ 540S (Active) PVA Fluid Suspension | 122 |
| 8% Starch with 0.5% Airvol ™ 540S (Active), PVA Fluid Suspension | 212 |

These tests show that at higher concentrations the fluidized polymer suspension of PVA from Example 1 unexpectedly gave significantly improved size press treatment results of the paper as compared to dry PVA at equal active dosage.

EXAMPLE 11

The polymer suspensions of PVA from Examples 1, 2, 3, 4, 5, 6, 7, and 8 were added to dilution water and stirred to dissolve at a final solution concentration of 5% active PVA. These solutions were then allowed to stand in jars for a period of 16 hours or longer.

It was observed in the case of the sodium formate polymer suspension of Example 1, that only a relatively minor quantity of settled insoluble material was observed in the PVA solution. This insoluble material constituted a settled layer of approximately 5% of the volume of the storage container. This material was readily dispersible in water.

It was observed in the case of the fluid polymer suspension of PVA prepared in Dispex N-40 from Example 6 that an extremely viscous settled layer, comprising approximately 10% of the volume of the storage container, was observed. The top most phase of the stored solution in this case was clear and very fluid. This two phase separation could potentially have utility in some as yet undefined application.

It was found in the case where sodium formate was employed in conjunction with salts, such as sodium carboxymethylcellulose or styrene maleic anhydride copolymer (SMA) from Example 4, that significant phase separation of the PVA solution was observed. In the case of the polymer suspension containing SMA, a clear bottom layer was observed.

In all of the other PVA solutions, a significant quantity of undissolved material, constituting greater than 10% of the volume of the storage containers, was observed. The salts present in these systems included sodium sulfate, potassium sulfate, magnesium sulfate, sodium citrate, potassium citrate, and potassium carbonate.

It was shown in this Example that sodium formate was a preferred salt for preparing fluid suspensions of PVA that would have as their intended use a concentrated solution of PVA in dilution water.

EXAMPLE 12

The fluid suspensions of PVA from Examples 1, 2, 3, 4, 5, 6, 7, and 8 were added to dilution water in a ratio so as to yield 1% active PVA solutions after stirring to dissolve. These solutions were allowed to stand for 16 hours and then checked for the presence of insoluble material.

It was found in all cases that only a very small quantity of undissolved PVA was observed in these tests. It was thus demonstrated that the PVA suspensions of Examples 1, 2, 3, 4, 5, 6, 7, and 8 are useful for preparing dilute solutions of PVA.

EXAMPLE 13

Fifty gram quantities of the 1% active aqueous solutions of PVA prepared in Example 12 were added to aluminum pans and dried in an oven at 50° C. For comparative purposes, a control film was also prepared by drying a 1% active solution of Airvol® 540S in an aluminum pan.

In the control case, a clear continuous film was obtained after drying the PVA solution.

In the case of the PVA sample prepared in aqueous potassium carbonate (Example 7), the dried 1% active PVA solution did not form a continuous film but was instead a weak crusted mixture of salt and polymer. This result showed that potassium carbonate would not be useful to prepare fluidized polymer suspensions of PVA with end use utility as a film former.

In the case where fluid polymer suspensions of PVA were prepared in sodium sulfate, potassium sulfate or magnesium sulfate, from Examples 2, 3, 4, and 7, the dried films of the 1% active PVA solutions prepared from these samples were fairly clear, with little or no crystallized salt evident in the dried films. Sulfate salts, therefore, appear to integrate into the PVA film as this is formed during drying of the PVA solutions.

In the case of all the other films derived from PVA solutions that had been prepared from various polymer suspension systems, significant salt separation from the PVA films and crystallization occurred. Hazy films were observed in all of these cases. This applied for sodium formate, sodium citrate, potassium citrate, and Dispex® N-40, as well as mixtures of these salts.

This Example showed that sulfate salts were preferred for preparing fluid suspensions of PVA in the cases where clarity of the final PVA film would be a critical parameter of the PVA end use performance.

EXAMPLE 14

To 90 parts by weight of the suspension from Example 2 eight parts by weight of glycerin were added with stirring; then 2 parts by weight of Airvol® 540S were added to suspension and glycerin mixture, such that the final mixture was maintained at 20% by weight PVA. A fluid pourable suspension was observed.

The above suspension was added to dilution water at a ratio to yield a 1% active PVA solution and stirred to dissolve the PVA. This solution was then added to an aluminum pan and dried at 50° C.

The resultant film was found to be essentially clear and continuous. This film was found to be far less brittle than the control film of straight PVA in water from Example 13. The improved flexibility of the film obtained from a mixed polymer suspension system containing glycerin could be of value for a number of film applications in which PVA could be employed.

This Example demonstrated the utility of employing additional components such as glycerin in a formulated aqueous PVA polymer suspension to impart desirable final properties to PVA.

What is claimed:

1. An aqueous suspension comprising at least 20% by total weight of the suspension, of poly(vinyl alcohol) dispersed in an aqueous solution of at least one salt dissolved therein selected from the group consisting of sodium or potassium formate, sodium or potassium citrate, sodium or potassium polyacrylate and mixtures thereof, and a suspension stabilizer.

2. The suspension of claim 1 wherein the poly(vinyl alcohol) is 87–90% hydrolyzed.

3. The suspension of claim 1 wherein the dissolved sodium formate is further admixed with sodium carboxymethylcellulose or styrene maleic anhydride.

4. The suspension of claim 1 wherein the suspension contains xanthan gum as a suspension stabilizer.

5. The suspension of claim 1 wherein the suspension contains glycerin.

6. The suspension of claim 1 wherein the suspension contains sodium alginate.

7. The suspension of claim 1 wherein the suspension contains hydrophobic sizing agents.

* * * * *